No. 882,618. PATENTED MAR. 24, 1908.
G. A. BOTHWELL.
LOCOMOTIVE.
APPLICATION FILED JUNE 14, 1907.

3 SHEETS—SHEET 2.

WITNESSES:
INVENTOR.
George A. Bothwell
BY Ridout & Maybee
ATTORNEYS

THE NORRIS PETERS CO., WASHINGTON, D. C.

No. 882,618. PATENTED MAR. 24, 1908.
G. A. BOTHWELL.
LOCOMOTIVE.
APPLICATION FILED JUNE 14, 1907.

3 SHEETS—SHEET 3.

WITNESSES
INVENTOR.
George A. Bothwell
BY Ridout & Maybee
ATTORNEYS.

UNITED STATES PATENT OFFICE.

GEORGE A. BOTHWELL, OF OWEN SOUND, ONTARIO, CANADA.

LOCOMOTIVE.

No. 882,618.  Specification of Letters Patent.  Patented March 24, 1908.

Application filed June 14, 1907. Serial No. 379,067.

*To all whom it may concern:*

Be it known that I, GEORGE A. BOTHWELL, of the town of Owen Sound, in the Province of Ontario, Canada, have invented certain new and useful Improvements in Locomotives, of which the following is a specification.

In railway operation one of the great difficulties met with is the provision of suitable means for mounting the heaviest grades on the line. A locomotive of sufficient power to transport the heaviest of the ordinary loads on the level, or over moderate grades, is often entirely inadequate to mount the heavy grades. The difficulty is ordinarily overcome in various manners, such for example as providing special engines to be used only on the heavy grades, or the use of an extra locomotive at such points. I aim to overcome the difficulty by so constructing a locomotive that, while ordinarily perfectly adapted for use on the level or moderate grades, it yet may be almost instantly adapted to surmount the heaviest grades met with. I attain this result by providing means whereby the ordinarily small idle wheels of the locomotive and tender may be used as drivers and the ordinary large drivers freed from driving engagement with the rails whenever power and increased traction is desired to enable the locomotive with its train to surmount a grade. I prefer to withdraw the ordinary large drivers from their driving engagement by means of small supplemental wheels vertically movable so that they may be engaged with the rails and the ordinary large drivers lifted therefrom. The supplemental wheels are preferably driven from the ordinary driving wheels, and the ordinary idle wheels of the locomotive driven from the supplemental wheels.

Figure 1:
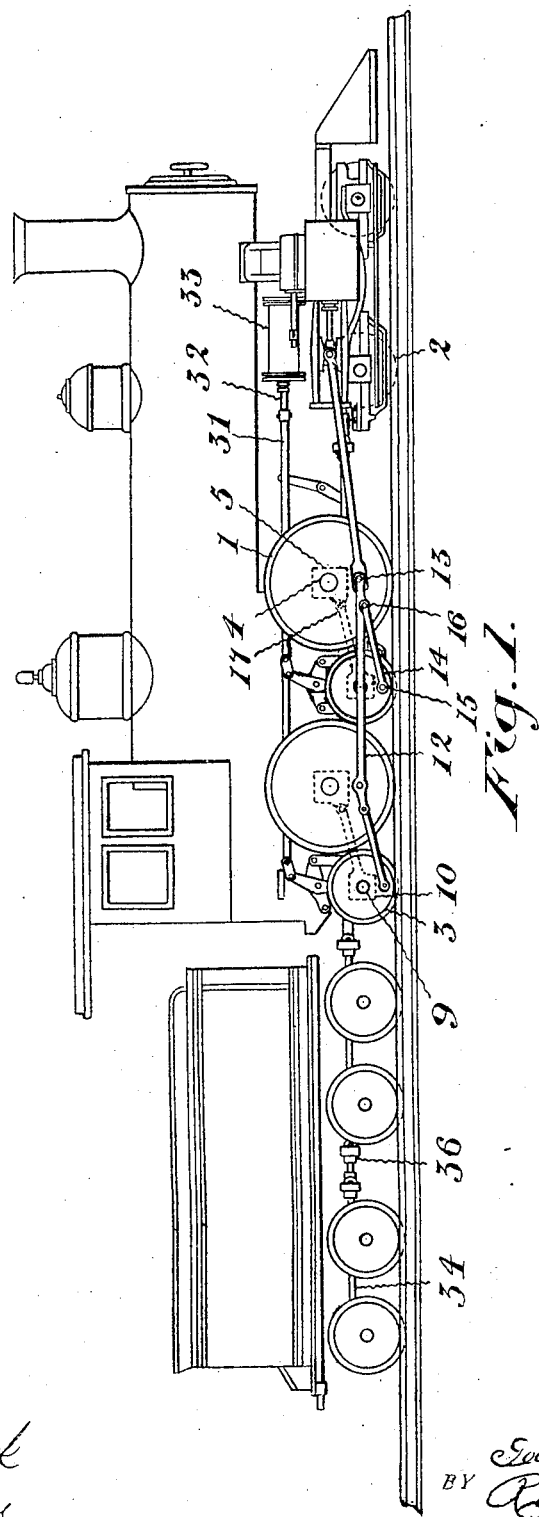
Figure 2:
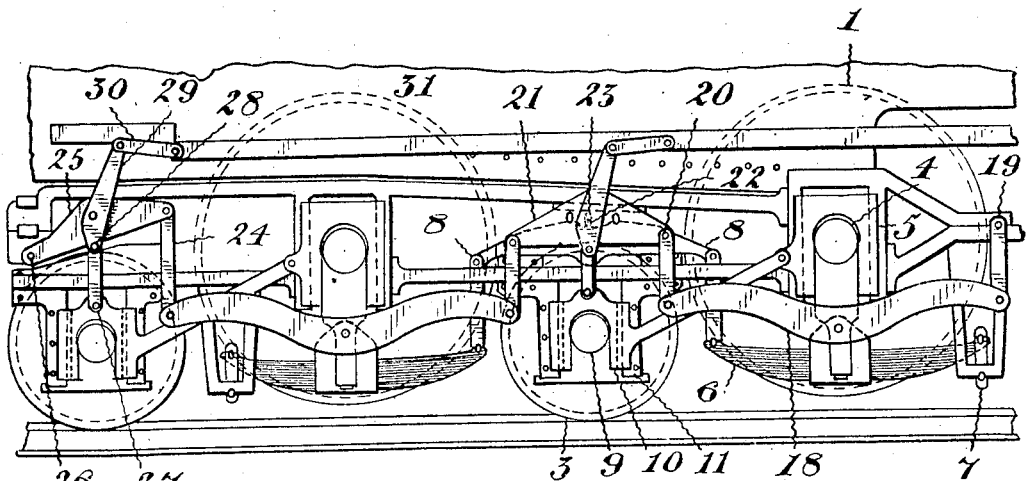
Figure 4:
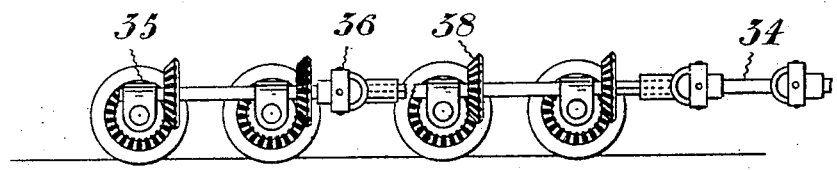
Figure 6:
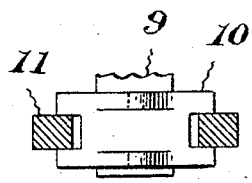
Figure 7:
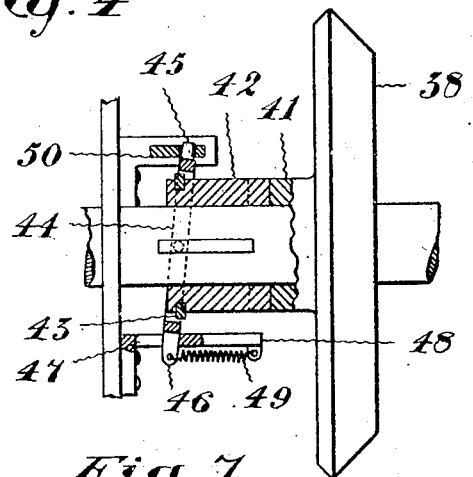
Figure 5:
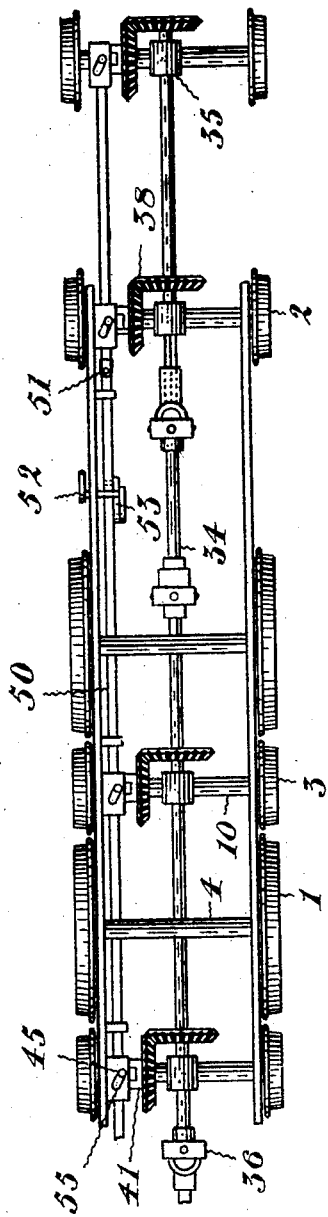
Figure 3:
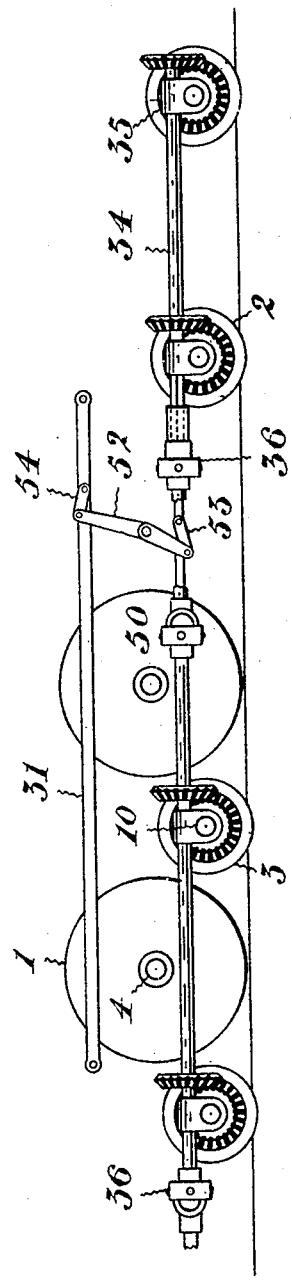

Figure 1 is a side elevation of a locomotive and tender constructed in accordance with my invention. Fig. 2 is an enlarged side elevation of part of the locomotive showing particularly the means employed for supporting and imparting vertical movement to the supplemental wheels. Fig. 3 is a longitudinal sectional elevation of parts of the locomotive showing particularly the means for driving the idle wheels. Fig. 4 is a similar view of parts of the tender. Fig. 5 is a plan view of parts of the locomotive showing more particularly the drive mechanism of the idle wheels and the clutches of the same. Fig. 6 is a sectional plan view of one of the bearing boxes of the supplemental wheels and its guides. Fig. 7 is a sectional detail of one of the clutches.

In the drawings like letters of reference indicate corresponding parts in the different figures.

In the locomotive and tender the main features are similar to those ordinarily employed.

On the locomotive 1 are the driving wheels and 2 the wheels of the bogie, normally running idle.

3 are supplemental wheels, adapted to run on the same track as the driving wheels 1. The frame work of the locomotive is, of course, suitably shaped to carry the different wheels and the other parts hereinafter to be described. The axles 4 of the driving wheels are journaled in boxes 5, carried in the frame work of the engine in the ordinary manner. These boxes are connected by suitable hangers with elliptic springs 6, which are of ordinary construction and arrangement and need not be specifically described. Suffice it to say that each spring is connected at one end to the frame work of the locomotive by the links 7, and the other ends by the equalizer system 8 of the usual type. The axles 9 of the supplemental wheels 3 are journaled in the boxes 10 which embrace the guides 11 formed on the frame of the locomotive in such a manner that the boxes are vertically and longitudinally movable within certain limits. (See Fig. 6). A vertical movement of three or four inches is ordinarily sufficient while the longitudinal movement may be considerably less. Before, however, describing the means for supporting and moving the bearing boxes of the supplemental wheels it will be necessary to describe the method employed for driving these supplemental wheels. At present it will be sufficient to say that means are provided for raising and lowering the supplemental wheels so that either the ordinary driving wheels or the supplemental wheels may be brought into driving connection with the track. The ordinary driving wheels are driven from the cylinders of the engine in the ordinary well known manner, and the driving wheels are connected by the side bars 12 journaled on the wrist pins 13 of the driving wheels. The supplemental wheels will be driven from the ordinary driving wheels. This may be done in various ways but I prefer to impart the movement to the supplemental wheels from the driving wheels by providing connecting rods 14 which are journaled on wrist pins 15 on the supplemental wheels 3 and on wrist pins 16 on the side bars 12 close to the wrist pins 13. Thus the supplemental wheels are rotated at the same rate as the ordinary driving wheels, but owing to their smaller diameter their peripheral speed is much less and the power of the locomotive increased with of course a corresponding decrease in speed.

We may now consider the method of supporting the journal boxes 10 of the supplemental wheels. Each journal box has a link 17 connected with it, which link runs parallel to one of the connecting rods 14, and is pivotally connected with the journal box 5 of the driving wheel in front, to form with one of the connecting rods 14 a parallel motion which, within the limits of movement of the box of the supplemental wheel, maintains the center of the supplemental wheel at a constant distance from the center of the ordinary driving wheel adjacent to the wrist pin by which the connecting rod driving the supplemental wheel is journaled on the side rod. The links 17 are preferably rigidly secured to the boxes 10 of the axles of the supplemental wheels. These links thus form the sole means of holding the boxes of the supplemental wheels in position longitudinal of the locomotive.

It is advisable to utilize the springs 6 of the main driving wheels to cushion the locomotive when the supplemental wheels are in use. For this purpose I employ the following mechanism:—18 are equalizer levers, each pivoted on the hanger of one of the springs 6. The forward end of the forward equalizer lever is pivotally connected with the lower end of the link 19, the upper end of which is pivoted on a suitable part of the frame of the locomotive. The rear end of the forward equalizer lever and the forward end of the rearward equalizer lever are each pivotally connected by means of a link 20 with an equalizer lever 21, which is vertically movable on the frame of the locomotive, its pivot 22 being movable in a short slot 23 in the frame. The rearward end of the rearward equalizer lever 18 is pivotally connected to the lower end of the link 24, the upper end of which is pivotally connected with the equalizer lever 25. The rearward end of this equalizer lever 25 is pivoted at 26 on the frame of the locomotive. It is evident from this construction that by pressing the boxes 10 of the supplemental wheels downwardly by upward pressure against the equalizer levers 21 and 25 the weight of the locomotive may be supported on the supplemental wheels through the medium of the springs 6, the links 19, the forward equalizer lever 18, the links 20, the equalizer lever 21, the rearward equalizer lever 18, the link 24, and equalizer lever 25. For the purpose of imparting this movement to the said journal boxes 10 I pivot on each of the equalizer levers 21 and 25 a toggle lever 27, of which 28 is the central pivot. The lower part of each toggle lever is pivotally connected with the journal box 10 below it.

29 is an arm extending upwardly from the upper portion of each toggle lever. These arms 29 are pivotally connected with links 30, which are pivotally connected with the longitudinal bar 31. This bar is suitably connected with the piston rod 32 of a cylinder 33, which may be operated by steam or air, as may be convenient, to longitudinally move the bar and thus operate the toggle levers 27. These toggle levers are shown in Fig. 2 in the position they assume when the supplemental wheels are forced downwards and the ordinary driving wheels thus raised. It will be readily seen that by swinging these toggle levers rearwardly that the journal boxes of the supplemental wheels will be lifted and the supplemental wheels thus raised from the track. It will also be seen that when the supplemental wheels are in use the weight of the locomotive is supported upon them solely by means of the connections described with the equalizer system and the links 17 connecting the journal boxes of a supplemental wheel and the driving wheel forward of it. It will be understood of course that the parts described are duplicated on the opposite side of the engine.

I will now describe the means provided for driving the idle wheels of the locomotive and the tender from the supplemental wheels. A longitudinal shaft 34 is provided which runs over the axles of the supplemental wheels and idle wheels from the rear axles of the tender to the axles of the bogie of the locomotive. This shaft is carried in suitable bearings 35 supported on the axles it crosses. Owing to the fact that the height of the axles of the supplemental wheels varies, as already described, and as, of course, the axles of the tender and the axles of the bogie are not always parallel to the axles of the supplemental wheels, it is necessary that universal telescopic joints 36 be formed in the shaft 34 between the supplemental wheels and the normally idle wheels of the bogie, between the supplemental wheels and the normally idle wheels of the tender, and also between the two trucks of the tender. This permits of the necessary play of the shaft up and down, laterally, and longitudinally without impairing its efficiency as a driver. To the axles of the supplemental wheels, the axles of the bogie, and the axles of each truck of the tender I gear the longitudinal shaft 34 by means of skew bevel gearing 38. Thus when the supplemental wheels are driving the locomotive the normally idle wheels of the locomotive and tender may be simultaneously driven by means of the shaft 34 and gearing 38.

As it is necessary that the idle wheels of the bogie and tender should run free when the ordinary drivers are in engagement with the track, I provide the axles of the supplemental and idle wheels with clutches 41 whereby the bevel gearing 38 on each axle may be thrown in or out of clutch with the axle. The clutches are sliding clutches of ordinary description. A detail of one of these clutches is shown in Fig. 7. I prefer to employ clutches of the ordinary positive type, and 42 is a movable part of such a clutch. A shifter ring 43 is journaled in a suitable groove in the movable part 42. A shifter 44 is pivotally connected with the shifter ring. The upper end of this shifter is provided with a projection 45 whereby the shifter may be moved. A projection 46 is formed at the under side of the shifter and extends into a short transverse slot 47 formed in a part 48, suitably secured to or forming part of a stationary part of the frame. A coil spring 49 is secured at one end to a stationary part and at the other to the lower part of the shifter 44. It thus tends to hold the clutch in engagement and the projection 46 close to the inner end of the slot 47. Mechanism must be provided whereby these clutches are simultaneously placed in and out of clutch when the supplemental wheels are lowered or raised. I illustrate for this purpose a longitudinal bar 50 provided with joints 51 wherever necessary to permit of the swinging of the bogie of the locomotive or the trucks of the tender. This bar is guided in any suitable manner, and is provided with diagonal slots 55 engaging the projections 45. It is evident that by moving this bar longitudinally a lateral movement will be imparted to the shifter 44 to engage and disengage the clutches. This longitudinal bar is operated from one of the longitudinal bars 31 which impart the vertical movements to the supplemental wheels. For this purpose I employ a cranked lever 52 suitably fulcrumed on the frame of the locomotive. One part of this lever is necessarily outside the frame and the other inside. The inner part of this lever is connected by means of the pivoted link 53 with the longitudinal bar 50. The outer and upper part of the lever is connected by a similar link 54 with one of the longitudinal bars 31. Thus the bar 50 moves simultaneously with the bar 31, and the clutching and unclutching of the bevel gearing 38 is simultaneous with the downward and upward movements of the supplemental wheels.

It will be noted that the springs 49 yield to prevent any breakage if the longitudinal bar is moved to shift the movable part of the clutches into gear when the two clutch parts are not in proper position for the clutch faces to engage, the spring subsequently snapping the parts of the clutch together as soon as a proper position has been reached by the rotation of the axle with which the movable part of the clutch rotates. There is a little backward or forward play of the clutches on the axle of the idle wheels compared with the clutches of the supplemental wheels, owing to the fact that the axles of these idle wheels ordinarily are capable of a swinging motion to follow the curves of the track, and this causes movements of the projections 45 in the slots 55 in the bars 50, but the springs 49 will take care of this lost motion without impairing the engagement of the clutches, until the bars are operated in the manner described to shift the clutches. From this construction it follows that either the ordinary drivers or the supplemental wheels and normally idle wheels may be used to drive the engine. As these supplemental and idle wheels are considerably smaller in diameter than the ordinary drivers there is a corresponding increase of power obtained when using these drivers, but, of course, with a decrease in speed. The engine is thus given ample power to climb a grade, and is given an added traction on the rail, which is particularly necessary when pulling heavy loads on slippery rails. When running on a level the weight of the locomotive is transferred to the ordinary driving wheels, and the engine becomes, for all practical purposes, an engine of ordinary construction.

What I claim as my invention is:—

1. A locomotive provided with ordinary driving wheels; normally idle wheels; means for raising the driving wheels clear of the track; and means for driving the idle wheels when the ordinary driving wheels are so raised.

2. A locomotive provided with ordinary driving wheels; normally idle wheels; means for raising the driving wheels clear of the track; means for driving the idle wheels from the ordinary driving wheels; and means for freeing the idle wheels when the ordinary driving wheels are in engagement with the track.

3. A locomotive provided with ordinary driving wheels; normally idle wheels; means for driving the idle wheels from the ordinary driving wheels; and means for freeing either sets of wheels at will.

4. A locomotive provided with ordinary driving wheels; normally idle wheels; supplemental wheels; means for lowering the supplemental wheels to raise the driving wheels; means for driving the supplemental wheels and idle wheels from the ordinary driving wheels; and means for freeing the idle wheels when the ordinary driving wheels are lowered to drive.

5. A locomotive provided with ordinary driving wheels; normally idle wheels; supplemental wheels; a tender provided with normally idle wheels; means for lowering the supplemental wheels to raise the driving wheels; means for driving the supplemental wheels and idle wheels from the ordinary driving wheels; and means for freeing the idle wheels when the ordinary wheels are lowered to drive.

6. A locomotive provided with ordinary driving wheels and normally idle wheels; a tender provided with normally idle wheels; means for driving the idle wheels from the ordinary driving wheels; and means for freeing either sets of wheels at will.

7. A locomotive provided with ordinary driving wheels; normally idle wheels; supplemental wheels; a longitudinal shaft geared to the axles of the idle wheels and the supplemental wheels; a telescopic universal joint in the said shaft between the supplemental wheels and the idle wheels; means for lowering the supplemental wheels to raise the driving wheels; means for driving the supplemental wheels; and means for freeing the idle wheels from their drive when the ordinary driving wheels are lowered to drive.

8. A locomotive provided with ordinary driving wheels; normally idle wheels; supplemental wheels; a tender provided with normally idle wheels; a longitudinal shaft geared to the axles of the idle wheels and the supplemental wheels; telescopic universal joints in the said shaft between the supplemental wheels and the idle wheels; means for lowering the supplemental wheels to raise the driving wheels; means for driving the supplemental wheels; and means for freeing the idle wheels from their drive when the ordinary driving wheels are lowered to drive.

9. A locomotive provided with ordinary driving wheels; normally idle wheels; supplemental wheels; means for lowering the supplemental wheels to raise the driving wheels; means for driving the supplemental wheels and idle wheels; and means for freeing the idle wheels when the ordinary driving wheels are lowered to drive.

10. A locomotive provided with ordinary driving wheels; supplemental wheels; side rods connecting the wrist pins of the driving wheels; and connecting rods each pivotally connected to a supplemental wheel and one of the side rods.

11. A locomotive provided with ordinary driving wheels; supplemental wheels vertically and longitudinally movable; journal boxes for the axles of said wheels; side rods connecting the wrist pins of the said driving wheels; connecting rods each pivotally connected to a supplemental wheel and one of the side rods adjacent to one of the ordinary driving wheels; and means connected with said journal boxes for maintaining a constant distance between the centers of the supplemental wheel and the said driving wheel.

12. A locomotive provided at each side with ordinary driving wheels and springs therefor; supplemental wheels vertically movable; an equalizer system connected with the springs and with the frame of the locomotive; and means connected with the equalizer system for raising and lowering the supplemental wheels.

13. A locomotive provided with ordinary driving wheels; normally idle wheels; supplemental wheels; means for driving either by the ordinary driving wheels or by the supplemental wheels; and means for gearing the idle wheels to the supplemental wheels when the latter are driving.

14. A locomotive provided with ordinary driving wheels; normally idle wheels; supplemental wheels; means for driving either by the ordinary driving wheels or by the supplemental wheels; a longitudinal shaft geared to the axles of the supplemental and the idle wheels; a telescopic universal joint in the said shaft between the supplemental wheels and the idle wheels; and means for freeing the idle wheels from their drive when the ordinary driving wheels are driving.

15. A locomotive provided with ordinary driving wheels; normally idle wheels; supplemental wheels; a tender provided with normally idle wheels; means for driving either by the ordinary driving wheels or by the supplemental wheels; a longitudinal shaft geared to the axles of the supplemental and the idle wheels; telescopic universal joints in the said shaft between the supplemental wheels and the idle wheels; and means for freeing the idle wheels from their drive when the ordinary driving wheels are driving.

16. A locomotive provided with driving wheels; a plurality of pairs of normally idle wheels; a longitudinal shaft between the axles of said idle wheels geared to said axles by bevel gearing; a longitudinal shaft passing over the axles of the idle wheels; gearing between the axle of the driving wheels and said shaft; and gearing between said shaft and the first mentioned shaft.

17. A locomotive provided with ordinary driving wheels; supplemental wheels vertically and longitudinally movable; journal boxes for the axles of said wheels; side rods connecting the wrist pins of the said driving wheels; connecting rods each pivotally connected to a supplemental wheel and one of the side rods adjacent to one of the ordinary driving wheels; links each parallel to and of the same length as one of the connecting rods, and suitably connected with the said journal boxes to form with the said connecting rods parallel-motion devices tending within the limits of movement of the supplemental wheels to maintain a constant distance between the centers of the supplemental wheels and the driving wheels adjacent to the point of connection between the connecting rod of any given supplementary wheel and the driving wheel near which said connecting rod is connected to the side rod.

18. A locomotive provided at each side with an ordinary driving wheel; a journal box for the said driving wheel; a spring supporting the locomotive from said journal box; a supplemental wheel; a journal box for the axle of the said supplemental wheel; guides for the journal box of the axle of the supplemental wheel in which said box is vertically and longitudinally movable; a link connection between the journal boxes of the two wheels; and means connected with the frame of the locomotive and with the spring for raising and lowering the journal box of the supplemental wheel.

19. A locomotive provided at each side with ordinary driving wheels; springs therefor; supplemental wheels; vertical movable boxes in which the axles of said supplemental wheels are journaled; an equalizer system connected with the springs and with the frame of the engine; a longitudinally movable bar; toggle levers each pivotally connected with the equalizer system and with one of the boxes; an arm extending from each toggle; and a link pivotally connecting each arm with the longitudinal bar.

Toronto, Ont., 8th June, 1907.

GEORGE A. BOTHWELL.

Signed in the presence of-
D. S. TOVELL,
J. EDW. MAYBEE.